…

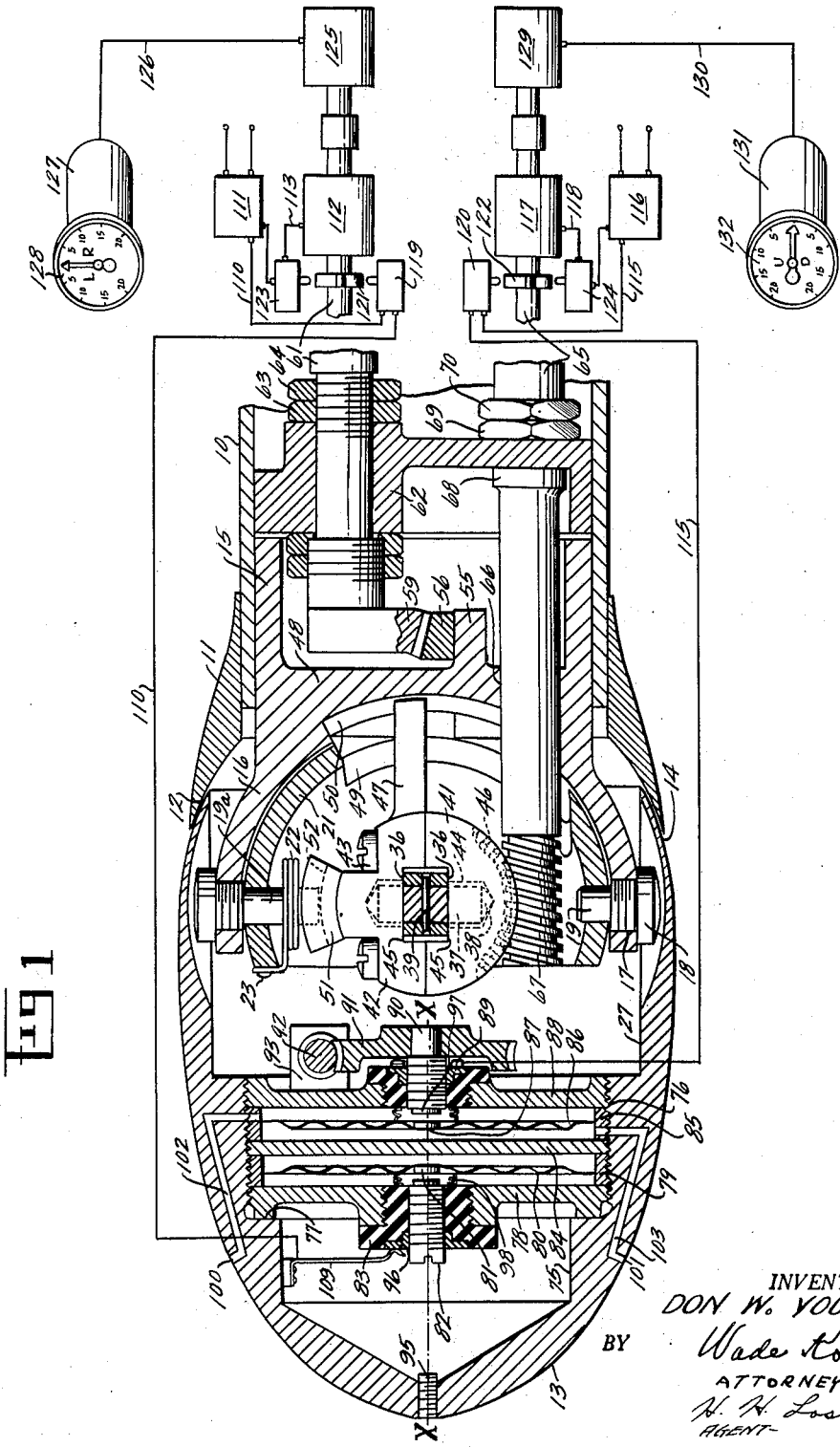

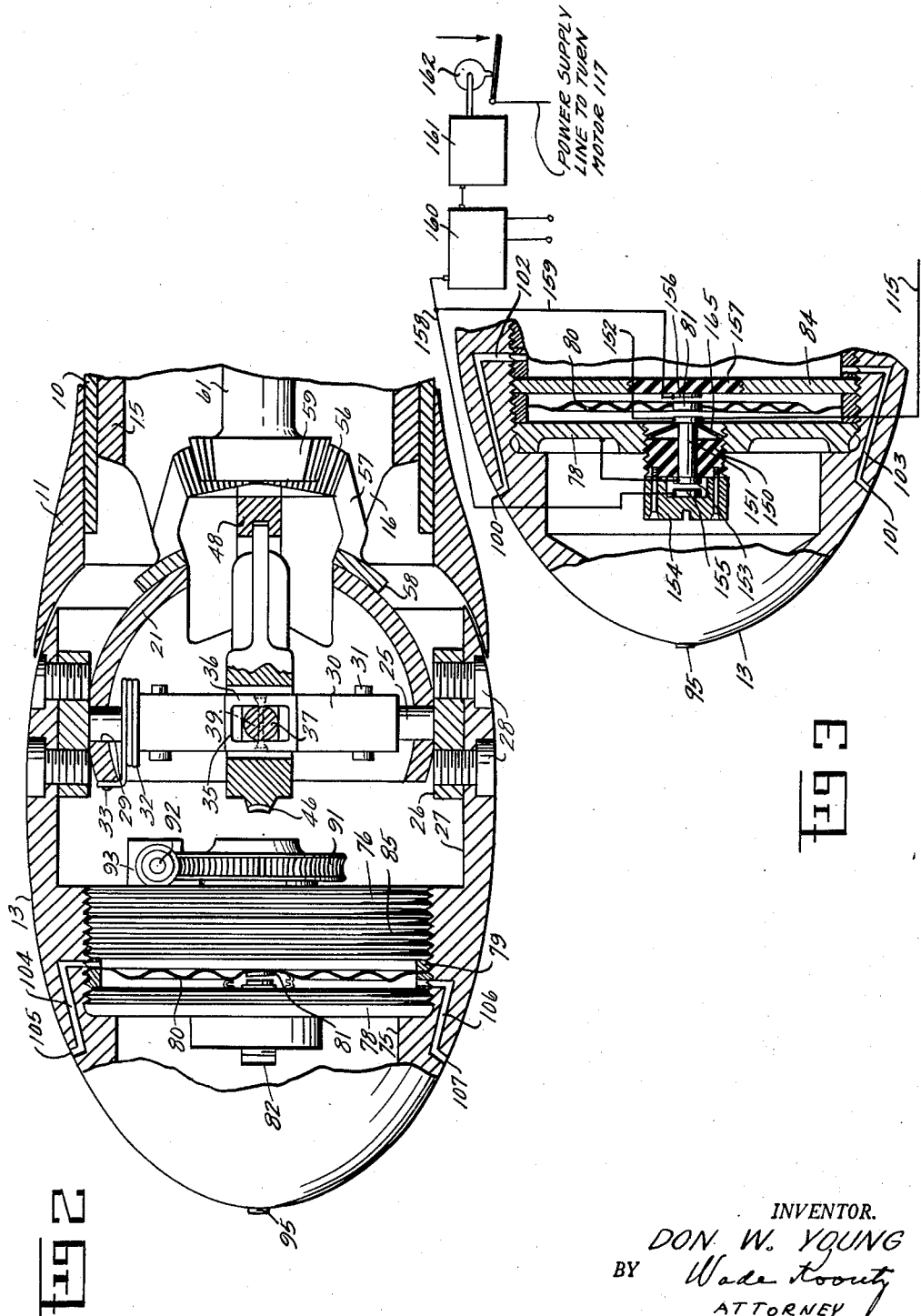

UNITED STATES PATENT OFFICE 2,513,390

ANGLE OF ATTACK AND YAW DEVICE, NULL PRESSURE TYPE

Don W. Young, Dayton, Ohio

Application June 11, 1948, Serial No. 32,516

10 Claims. (Cl. 73—180)

(Granted under the act of March 3, 1883, as amended April 30, 1928; 370 O. G. 757)

The invention described herein may be manufactured and used by or for the Government for governmental purposes without payment to me of any royalty thereon.

This invention relates to pitch and yaw angle indicators and more particularly to the null pressure type that indicates pitch and yaw angles simultaneously with respect to the air stream of a vehicle carrying the device through the atmosphere.

In my application entitled Angle of Attack and Yaw Indicator, bearing Serial No. 702,352, filed October 10, 1946, and patented March 8, 1949 as Patent No. 2,463,585, I set forth objects and advantages of a device for sensing the angle of pitch or the angle of yaw with respect to the air stream upon the device being carried through the atmosphere by some vehicular means, as aircraft. The single instrument of that application was adaptable to be controlled to indicate either the pitch angle or the yaw angle and has met with great favor as a precision instrument. However, it is most desirable to have a continuous and simultaneous indication of both the angles of pitch and the angles of yaw in the navigation of a vehicle using the device. Using one instrument for registering pitch angles and another for registering yaw angles as a solution given in the above named application is quite satisfactory but for the extra cost of the two complete instruments, the additional installation requirements, the additional weight and the difficult problem of determining two desirable positions for the two instruments.

In the present invention, a sensing device is produced for providing both indications of pitch and yaw angles continuously and simultaneously. To accomplish this, the differential pressure sensing head is made to rotate about either of two normally arranged axes of rotation to provide universal rotative movement in the sensing head. One turn motor operates to actuate the sensing head about one of its axes, as the pitch axis, and another turn motor operates to actuate the sensing head about its other axis, or the yaw axis. A self-synchronous transmitter-receiver couples the pitch axis operating motor to a pitch axis indicating or recording means and a yaw axis indicating or registering means is operative through a similar self-synchronous coupling to the yaw axis operating turn motor although other coupling means may be used, as direct mechanical drives, fluid, or electrical couplings known in the art. Each motor has a control circuit including a differential pressure control switch, each switch being subjected to differential pressure imposed thereon from corresponding pairs of ports in the sensing head to effect rotation of the respective motor to equalize the pressure in the corresponding pair of ports. The ports in the vertical plane of the sensing head are associated with the switch controlling the pitch axis motor while the ports in the horizontal plane are associated with the switch controlling the yaw axis motor. Each motor circuit incorporates sensing head limit switches and relays substantially the same as described for the indicating device shown and described in my above mentioned application.

It is a primary object of this invention to provide a pitch and yaw indicating device capable of registering pitch and yaw angles continuously and simultaneously.

It is another object of this invention to provide a sensing head member that is universally supported on a mobile vehicle in the free air stream or mounted stationary in an air flow region to sense angular deviations of a reference line of the instrument with respect to the air stream in both the vertical and horizontal planes and effect registrations of these angular deviations on pitch and yaw indicators, recorders, or to operate vehicle directional and pitch control appliances.

It is a further object of this invention to provide a single instrument for continuously and simultaneously registering pitch and yaw angles of a longitudinal reference line thereof with respect to the impinging air stream by universally mounting a sensing head to rotate about two axes which are normal to each other, one of which is normal to the sensing head axis of symmetry and the other of which is normal to the longitudinal center line of the instrument, the sensing head being rotatable about each of its axes by a turn motor, one turn motor being under the control of a differential pressure responsive switch that is subjected to differential pressure from two ports arranged symmetrically about the sensing head axis of symmetry in a plane normal to the axis about which the associated turn motor exercises control and the other turn motor being under the control of another differential pressure responsive switch that is actuated by differential pressures transferred thereto from two ports lying symmetrically with the sensing head axis of symmetry and in a plane normal to the axis about which the associated turn motor rotates the sensing head, one set of ports being responsive to the air stream to establish control of the corresponding turn motor for equalizing pressure in the set of ports for angles of pitch and the other set of ports having the pressure equalized therein upon the corresponding motor being activated for angles of yaw, and each motor being associated through self-synchronous transmitter-receivers to indicators to register the corresponding angles of pitch and yaw.

These and other objects and advantages will become more apparent as the description proceeds when taken in conjunction with the accompanying drawings illustrating the preferred form of the invention, in which:

Fig. 1 is a partial longitudinal sectional view of the sensing device with parts shown diagrammatically to facilitate the description of the inventive concept;

Fig. 2 is a partial sectional view of the sensing head and support taken on the longitudinal center line of the instrument; and Fig. 3 is a partial sectional view of a modification of the pressure responsive diaphragm switches for use as in interrupter.

Referring more particularly to Figs. 1 and 2, there is shown a tubular support 10 being adaptable on one end to be mounted onto a mobile vehicle or stationary object (not shown) in free air stream relation. The outward extending end of the tubular support is flared outwardly at 11 to form a concave spherical surface mouth portion 12 to receive a sensing head 13 having a spherical surface 14 companion to the mouth portion 12. The sensing head 13 is hollow and open at the rear and may take various shapes which would be most suitable aerodynamically for anticipated air speeds. For the purpose of illustration, the leading portion of the sensing head is shown as being parabolic. Within the end portion of the tubular support 10 is a gimbal support 15 fastened in any well known manner having two outstanding arms 16 that are curved outwardly in the form of a circle, the center of which is fixed at the center of curvature of the spherical surface 12. The arms 16 are spaced from the spherical surface 12 of the tubular support 10 a sufficient amount to allow free universal movement of the sensing head spherical portion 14 between the spherical surface 12 and the arms 16. At diametrically opposed points on the arms 16 are threaded openings 17 for receiving cap screws 18 having inner journal portions 19 on which is pivotally mounted a spherically shaped gimbal element 21. The upper cap screw has an extended journal portion 19a on which is mounted the inner end of a spirally wound spring 22 the outer end of which is fastened as by a rivet or screw means 23 to the outer perimeter of the gimbal element 21 to produce a small bias in one rotative direction on the gimbal element 21 for the purpose later to be described.

As best viewed in Fig. 2, a second axis of the sensing head 13 is formed by two shafts 25 having flanged ends 26 that are supported on the inner cylindrical surface 27 of the sensing head 13 by screws 28 passing through the sensing head 13 and threaded into the flanged ends 26 of the shafts 25. The shafts 25 are positioned such that the axis formed thereby passes through the common center for the spherical surfaces 12 and 14. The shafts 25 pass through openings 29 in the gimbal element 21 which openings are positioned 90 degrees from the journal points 19. Connecting the two shaft ends 25 is a large shaft 30 which has concentric longitudinally drilled openings in the ends thereof that receive the shafts 25. Pins 31 pass through openings drilled transversely of the connecting shaft portions to form a positive non-rotative connection between the sensing head 13 and the large shaft 30. A spirally wound spring 32 has its inner end attached to the large shaft 30 and its outer end attached, as by a pin or screw 33, to the outer perimeter of the gimbal element 21 to produce a slight bias in one rotative direction in the sensing head 13 for the purpose later to be described.

Centrally of the large shaft 30 is a rectangular opening 35 which is arranged perpendicularly to the axis of symmetry, generally referred to as the X-axis, of the sensing head. The central portion of the large shaft 30 is also flattened at 36 on the two sides surrounding the opening 35. Passing through the opening 35 is a pin 37 (note Fig. 1) having tapered or conical ends 38. The pin 37 is squared at its mid portion to a size substantially the same as the short side of the rectangular opening 35 and the pin 37 is retained in the opening 35 by a small key pin 39 such that the pin 37 will have slight rotative movement in a plane passing through the shaft axis but is retained from any rotative movement in a plane transversely of the shaft axis. Encircling the large shaft 30 at its flattened portion 36 is a sector gear member made in two sections 41 and 42 which are held together by screws 43. Each section 41, 42 has a cylindrical recess 44 to receive the pin 37 with a bearing established at the conical points 38. The opening in the sector gear member receiving the flattened portion 36 of the large shaft 30 is flattened at 45 to freely receive the shaft portion 36. The central portion of the sector gear member section 41 has gear teeth 46 thereon and the upper section 42 has a rearwardly extending arm 47. The gimbal support 15 has a diametrical web portion 48, the forward surface of which is spherically concave to receive the gimbal element 21 with some clearance. The gimbal element 21 has an opening 49 therein through which the arm 47 extends and enters a slot 50 in the web portion 48 in which the arm 47 is free to slide when the sector gear member is rotated about its center on the large shaft 30. The section 42 of the sector gear member has an arcuate extension 51 thereon that has a guide channel 52 into which is extended the journal end 19a of the cap screw 18. The two guides 47, 50 and 52, 19a maintain the sector gear member 41, 42 in a plane which passes through the vertical plane of the instrument and the pin 37 keeps the sector gear member centrally located on the large shaft 30.

On the rearward side of the web portion 48 is a short extension 55 on which is slidably supported a sector gear 56 that has two leg portions 57 extending around the web portion 48 of the gimbal support 15 with considerable clearance and is fixed to the spherical gimbal element 21 by foot portions 58 as by welding, bolting, or the like. In meshing relation with the sector gear 56 is a pinion gear 59 driven by a shaft 61 which is rotatably mounted in the bearing member 62 supported in the tubular support 10. The shaft 61 has a nut and jam nut 63, 64 threaded thereon on opposite sides of the bearing member 62 to eliminate shaft end play. Through the bearing member 62 is a second shaft 65 which extends through an opening 66 in the web 48 and has a worm gear 67 on the end thereof that meshes with the sector gear 46 on the sector member 41, 42. Shaft 65 has an enlarged portion 68 abutting the bearing member 62 and a nut and jam nut 69, 70 threaded on the shaft 65 on the opposite side of the bearing member 62 to eliminate shaft end play. It may now be seen that the two shafts 61 and 65 are operative to rotate the sensing head 13 in the two axes of rotation formed by the pivots 19 and 29. A clockwise rotation of shaft 61, looking forward over the device, rotates the sector gear 56 (see Fig. 2) clockwise carrying the gimbal element 21 and sensing head 13 along in the clockwise direction about the axis formed by the pivots 19. Swing of the large shaft 30 is permitted in the rectangular opening 45 of the sector gear member 41, 42, the pivoting taking place about the conical points 38 of the pin 37. A counterclockwise rotation of the shaft 61, of course, transmits counterclockwise movement to the sensing head 13, as viewed in Fig. 2. Clockwise rotation of shaft 65, assuming the worm gear to be left-handed, will produce a clockwise rotation of the sector gear member 41, 42 which clockwise rotation is transmitted to the sensing head 13 through the pin 37, shafts 30 and 25, as viewed in Fig. 1, about the pivotal points 29. Counterclockwise rotation of the shaft 65 produces counterclockwise rotation of the sensing head 13. Rotation of the sensing head 13 about either of its axes may be carried out simultaneously and any back lash about either axis of movement will be taken up by the springs 22 and 32.

Referring particularly to Fig. 1, the forward end of the sensing head 13 is bored from the rear at 75 which bore is concentric with the sensing head axis of symmetry $x-x$. A threaded counterbore 76 connects the bore 75 with the interior of the sensing head 13 within the wall surface 27 forming a shoulder 77. A front partition wall member 78 is threaded in the threaded bore 76 until it engages the shoulder 77. Threaded against the wall member 78 is a collar 79 having a metallic diaphragm 80 attached centrally thereof in any well known manner. An electrical contact element 81 is fused to the central portion of the diaphragm 80 which cooperates with an adjustable contact element 82 threaded in an insulating bushing 83 that is threaded into the wall member 78. A dividing wall 84 is positioned against the collar 79 and a second collar 85 threaded against the dividing wall. The collar 85 has a metallic diaphragm 86 therein with a centrally located electrical contact 87. An outer wall member 88 is threaded against the collar 85 and carries an insulating bushing 89 centrally thereof which bushing has a contact element 90 threaded into the bushing 89 to cooperate with contact 87. The outer end of the contact element 90 has a sun gear 91 thereon that is rotatable by a small worm gear 92 journaled on a bracket 93 attached to the outer wall member 88. The shaft of the small worm gear 92 is slotted for the insertion of a screw driver in order that the clearance of contacts 87, 90 may be set from the exterior through a capped opening in the sensing head (not shown). The front contact element 82 is also slotted to receive a screw driver and may be reached through an opening in the sensing head that is normally closed by a removable screw plug 95. Each bushing 83, 89 has a terminal ring 96, 97 respectively therein for forming an electrical connection with the respective contact elements 82, 90. Very light boots 98 of rubber or the like, close the contacts from moisture and dirt.

Referring to Fig. 1 again, there are two ports 100, 101 in the sensing head 13 that are connected to the chamber containing the diaphragm 86, the port 100 being connected by a duct 102 to the back side of the diaphragm 86 and the port 101 being connected by the duct 103 to the front side of this diaphragm. In a very similar manner (see Fig. 2), the back side of the diaphragm 80 is connected by a duct 104 to a port 105 in the sensing head 13 while the front side of this diaphragm is connected by duct 106 to a port 107 in the sensing head 13. The pressure impressed at the ports of corresponding pairs, although this pressure may be sub-atmospheric, is impressed on opposite faces of the corresponding diaphragm to actuate the respective contacts.

In order for the sensing head 13 to always be maintained in the null position, each pressure responsive diaphragm switch 81, 82 and 87, 90 is connected in a reversible turn motor circuit to rotate the sensing head always in a direction to maintain equal pressures in each pair of respective ports. The contact element 82 is connected through the terminal ring 96, a contact spring 109 insulatingly attached to the sensing head and a conductor 110 to an electronic relay 111 which relay controls power loads to a reversible turn motor 112 through the cable 113. The turn motor 112 is mechanically connected to the shaft 61. The relay 111 is normally positioned to energize the motor 112 for rotation in the counterclockwise direction, looking forward, and energization of the relay 111, as by closure of contacts 81, 82, will reverse the turn motor 112 direction in the same manner as described for the turn motor in the aforementioned application. Likewise, the contact element 90 is connected through the terminal ring 97 and conductor 115 to a second electronic relay 116 that controls the power load to a turn motor 117 through conductor 118. Turn motor 117 is operative to control the sensing head about the axis formed by journals 29 through the shaft 65. The relay 116, as relay 111, normally connects the turn motor 117 to a power supply through a field winding to cause clockwise rotation thereof, looking forward, and consequently clockwise rotation of the sensing head 13, viewed in Fig. 1. Closure of the contact 87, 90 causes the relay switch to produce counterclockwise rotation of the turn motor 117 to effect counterclockwise rotation of the sensing head 13. Each conductor 110 and 115 has a limit switch 119, 120 therein that is actuated by a cam 121, 122 on the respective motor shaft to break the circuit and halt motor operation when the spherical head approaches its limit which has been constructed to be about 15 or 20 degrees. Limit switches 123 and 124 are arranged in the motor circuit to halt motor operation near the mechanical limit of the device in the direction of rotation opposite to that caused by relay energization.

Mechanically connected to the shaft 61 is a self-synchronous transmitter 125 that is electrically coupled through a cable 126 to a self-synchronous receiver motor 127 that drives an indicator 128. In like manner, a self-synchronous transmitter 129 connected to shaft 65 is electrically coupled by a cable 130 to a self-synchronous receiver 131 that drives an indicator dial 132. The rotor winding circuit of the self-synchronous transmitter-receiver system is energized by a voltage source for operation as is well understood in the art. While the self-synchronous receivers are shown and described as driving indicators, the self-synchronous receivers may control power relay switches or other means operative to switch power loads of the vehicle controlling means or the like, where desirable, or control appliances may be operated directly from the sensing head circuits as described in the aforementioned application. The self-synchronous transmitters 125 and 129 act as signal producing or generating means capable of effecting operation of self-synchronous receivers, which in turn are capable of operating various instrumentalities and producing useful functions or results.

For the purpose of illustrating the operation of the device, let it be assumed that the device is used on aircraft wherein the sensing head is positioned well out in the free air stream in the position shown in Fig. 1 such that the plane of the ports 100, 101 lie in the vertical plane of the aircraft. In this position, the two ports 100, 101, the differential pressure responsive switch 87, 90, turn motor 112 and indicator 128 all correspond to pitch axis deviations; while the ports 105, 107, the differential pressure responsive switch 81, 82, turn motor 117 and indicator 132 all correspond to yaw axis deviations. Assuming the aircraft incorporating the pitch and yaw indicating device of this invention to be in flight, the normal angle of attack assumed by the aircraft will have been effective in the ports 100, 101 to cause a greater pressure in the port 101 than 100 producing a greater pressure on the front side of diaphragm 86 than on the back side thereof causing the contacts 87, 90 to engage which energizes the relay 116 to cause turn motor 117 to rotate counterclockwise to rotate the sensing head 13 counterclockwise until the contacts 87, 90 break. Breakage of the contacts 87, 90 produces a reversal of the turn motor 117 to rotate the sensing head clockwise until the contacts 87, 90 are again engaged. The rotation of the shaft 65 produces a signal in the self-synchronous transmitter 129 which causes a corresponding rotation by the self-synchronous receiver 131 giving the pitch angle in degrees on the indicator 132. In actual practice, the turn motor 117 oscillates in the clockwise and counterclockwise directions in an attempt to maintain pressure in the ports 100 and 101 equal at which position the sensing head axis of symmetry $x$—$x$ is parallel to the air stream. However, this oscillation is extremely slight. In this manner, any change in pitch of the aircraft will produce immediate change of the sensing head to keep the axis of symmetry of the sensing head 13 in alignment with the air stream.

The operation of the sensing head for angles of yaw are the same as the operation for the sensing head for angles of pitch. For example, if the aircraft yaws to the left, a greater pressure will exist in the port 105, passage 104 and in back of diaphragm 80 than in front of this diaphragm causing the contacts 81, 82 to engage which closes a circuit through the relay 111 to effect clockwise rotation of the turn motor 112. The clockwise rotation of the motor 112 produces clockwise rotation of the sensing head 13 until the pressure in ports 105 and 107 are equal. The contacts make and break causing oscillation of the turn motor 112 in the same manner as explained for turn motor 117 and to maintain equal pressure in these ports. This yaw angle to the left is registered on the indicator 128 for flight personnel, or when the instrument is used for stationary mounting in an air stream, such as wind tunnels, for operating personnel. Since yaws to the right are registered in this same manner as yaws to the left, a further description of yaw angle operation is believed unnecessary. It is believed that from the foregoing description it is readily recognized that the pitch and yaw controls are operative simultaneously to register pitch and yaw angles on the indicators 132 and 128 continuously.

The electrical components of the present invention may, with extreme care and selection, be extremely sensitive and the contacts 82 and 90 adjusted such that any hunting in the system about the null positions of the sensing head may not present any difficulties. Without too much care in making the electrical components to operate with high precision, an interrupter may be placed in each motor circuit which will reduce hunting to a minimum if such hunting exists. However, such an interrupter reduces speed of operation of the instrument somewhat which is a disadvantage. It would be a decided advantage to have the interrupter operative for angles within one degree of the null position but inoperative for greater angles to allow the turn motor to speed the sensing head without interruption toward the null position.

The use of the interrupter in the turn motor circuit is accomplished by modifying the pressure responsive diaphragm switches in a manner shown in Fig. 3 wherein only one diaphragm switch is shown since the modification applies to both switches alike. The bushing 83 is replaced by a bushing 150 having a central opening through which a pin 151 of electrical insulating material is freely slidable. Contact elements 152 and 153 are attached to opposite ends of the pin 151, the contact element 152 being in close operative relation with the contact 81 of the diaphragm 80. A cap 154 encloses the contact element 153 and has a contact 155 attached therein that is slightly spaced from the contact element 153. The dividing wall 84 has a contact element 156 insulatingly held thereon as by a bushing 157 of insulating material, the contact 156 being slightly spaced from the contact 81. The contact 152 is connected to the electronic relay 116 through the conductor 115. Contacts 155 and 156 are connected by conductors 158 and 159 through a relay 160 which, when energized, disconnects the motor 161 from a voltage source to halt rotation of the cam 162 that operates to cause periodic breaking of the voltage supply source feeding the turn motor 117. The cam 162 may be weighted to prevent the cam from stopping in a position in which the circuit to the turn motor 117 remains open. The contact 153 is grounded to the frame of the device, the frame serving as one conductor of the system. Contact 81, as previously stated, is grounded through the metallic diaphragm 80. The contacts 152 and 153 are biased rearwardly to properly position them for operation by a spring diaphragm 165. Boots may be placed over these contacts in the same manner as earlier described. The range of operation of the interrupter is determined by the clearance provided between contacts 81, 156 and 153, 155. The clearance between contacts 81, 152 may be adjusted as before by the cap 154, slotted to receive a screw driver, that is non-rotatively fixed to the threaded bushing 150. By such switch means the respective turn motor will run steadily to return the sensing head 13 to approach null position until the interrupter becomes effective to periodically interrupt the motor circuit to bring the sensing head to the null position in small increments.

Another arrangement of this interrupter circuit just described may be that the interrupter can be continuously operative and the contacts 153, 155 and 81, 156 used to close a circuit bypassing the interrupter circuit to the turn motor 117. While the above described circuit interrupter means illustrates simple methods of acquiring precision in the instrument, it is to be understood that various means may be used in combination with the pressure differential switch means shown in Fig. 3 to produce fast operation of the sensing device to assume null positions for large angle deviations and slow approach to null positions for small angle deviations.

It is to be understood that various changes and modifications may be made in the several features and structure without departing from the spirit and scope of my invention and I desire to be limited only by the scope of the appended claims.

I claim:

1. A null type pitch and yaw indicating device for registering pitch and yaw angular deviations simultaneously with respect to the air stream comprising; a tubular support for attachment at one end to a supporting element to extend forwardly in free air stream relation and the other end being open to receive a sensing head, a sensing head universally mounted on said tubular support in said open end by a gimbal support pivotally holding a gimbal element providing rotation of said gimbal element about an axis transversely of a longitudinal center line of said tubular support, the gimbal element having journal portions in the plane of said last mentioned axis and 90 degrees therefrom through which a shaft extends connecting said sensing head; a motive power means operatively connected to said gimbal element for rotating said gimbal element about the axis formed by said gimbal support to rotate said sensing head, and a motive means operatively connected to said shaft for rotating said shaft to transmit rotation to said sensing head, one axis of rotation of said sensing head constituting a pitch axis and the other axis the yaw axis; a pair of pitch axis ports in said sensing head arranged symmetrically on opposite sides of an axis of symmetry of said sensing head in a plane normal to said sensing head pitch axis and a pair of yaw ports in said sensing head arranged symmetrically on opposite sides of said sensing head axis of symmetry in a plane normal to said sensing head yaw axis; differential pressure responsive controlling means in said sensing head and in communication with said pitch axis ports for controlling the activation of said motive means operative to rotate said sensing head about its pitch axis to maintain equal pressure in said pitch axis ports and a differential pressure responsive controlling means in said sensing head and in communication with said yaw axis ports for controlling the activation of said motive means operative to rotate said sensing head about its yaw axis to maintain equal pressure in said yaw axis ports; and pitch and yaw indicators associated with said sensing head to register angular deviations of said sensing head about the pitch and yaw axes, respectively, with respect to the longitudinal center line of said tubular support.

2. A null type pitch and yaw indicating device as set forth in claim 1 wherein each said motive means are electric turn motors that are operatively connected through gears and shafting to rotate said sensing head about the corresponding pitch and yaw axes and each said differential responsive controlling means is a diaphragm operated switch.

3. A null type pitch and yaw indicating device as set forth in claim 2 wherein said diaphragm operated switches have back contacts that are engageable upon large diaphragm movements in either direction which back contacts of each diaphragm operated switch controls an interrupter circuit supplying a voltage source to the corresponding electric turn motor whereby the corresponding turn motor will operate uninterrupted for large pressure differentials in the corresponding pitch and yaw axis ports and operative to null small pressure differences in the corresponding pitch and yaw ports in small increments.

4. A null type pitch and yaw indicating device responsive to angular deviations with respect to the air stream comprising; a universally mounted sensing head carried on a support for positioning of said head in an air flow region, said head having symmetrically arranged spaced apart pairs of ports in both the vertical and horizontal planes of said head and providing pressure sensing means responsive to pitch and yaw angular changes respectively, a pair of differential pressure responsive switches in communication with the vertically and horizontally arranged ports respectively, a pair of independent motor actuators responsive to closing of the respective switches to actuate said sensing head in directions at right angles to each other to maintain equal pressures in the spaced apart ports of each pair thereof, and separate means coupled to each of said motor actuators to simultaneously indicate the angular deviations of said sensing head with respect to said support in vertical and horizontal planes respectively.

5. A null type pitch and yaw indicating device responsive to angular deviations with respect to the air stream comprising; a tubular support for attachment at one end to a supporting element to extend forwardly in free air stream relation and the other end being open to receive a sensing head, a sensing head universally mounted in the open end of said tubular support and having two pairs of ports on the forward side of said sensing head, each pair of ports being arranged in symmetrically opposed positions from an axis of symmetry of said sensing head with the pairs being located in planes normal to each other, one pair of ports being in a vertical plane and subject to the pressure difference resulting from the air stream passing above and below the sensing head and the other pair of ports being in a horizontal plane and subject to the pressure difference resulting from the air stream passing along the right and left sides of the sensing head, a pair of differential pressure responsive switches in communication with the vertically and horizontally arranged pairs of ports respectively, a pair of independent motor actuators responsive to closing of the respective switches to actuate said sensing head in directions at right angles to each other to maintain equal pressures in the spaced ports of each pair thereof, and separate means coupled to each of said motor actuators to simultaneously indicate the angular deviations of said sensing head with respect to said tubular support in vertical and horizontal planes respectively.

6. A null type pitch and yaw indicating device responsive to angular deviations with respect to the free air stream comprising; an elongated supporting member for attachment at one end to a supporting element and extending forwardly in free air stream relation, a gimbal element rotatably mounted on the forward end of said supporting member, a sensing head having one side thereof hollowed out to receive said gimbal element, means rotatably mounting said sensing head with respect to said gimbal element on an axis normal to the axis of rotation of said gimbal element with respect to said supporting member, said head having symmetrically arranged spaced apart pairs of ports in both the vertical and horizontal planes of said head and providing pressure sensing means responsive to pitch and yaw angular changes respectively, a pair of differential pressure responsive switches in communication with the vertically and horizontally arranged ports respectively, a pair of independent motor actuators responsive to closing of the respective switches to actuate said sensing head in directions at right angles to each other to maintain equal pressures in the spaced apart ports of each pair thereof, and separate means coupled to each of said motor actuators to simultaneously indicate the angular deviations of said sensing head with respect to said support in vertical and horizontal planes respectively.

7. A null type pitch and yaw indicating device responsive to angular deviations with respect to the air stream comprising; a tubular support for attachment at one end to a supporting element and extending forwardly in free air stream relation, a sensing head universally mounted on said tubular support at the forward end by means of a pivotally mounted gimbal element having said sensing head pivotally connected thereto, said sensing head including two pairs of symmetrically arranged spaced ports on the forward side thereof arranged in the vertical and horizontal planes of said head and providing pressure sensing means responsive to pitch and yaw angular changes respectively, a pair of differential pressure responsive switches in communication with the vertically and horizontally arranged ports respectively, a pair of independent drive shafts extending in parallel relation through said tubular support longitudinally thereof, separate means at the outer end of the respective drive shafts for transmitting motion from the respective shafts to the sensing head and gimbal element respectively to turn said sensing head with respect to said gimbal element and to turn said gimbal element with respect to said tubular support, a pair of independent motors connected to said pair of drive shafts respectively and responsive to closing of the respective switches to actuate said sensing head in directions at right angles to each other to maintain equal pressures in the spaced ports of each pair thereof, and separate means coupled to each of said motors to simultaneously indicate the angular deviations of said sensing head with respect to said tubular support in vertical and horizontal planes respectively.

8. A null type pitch and yaw device responsive to angular deviations with respect to the air stream comprising; a universally mounted sensing head carried on a support for positioning of said head in an air flow region, said head having symmetrically arranged spaced apart pairs of ports in both the vertical and horizontal planes of said head and providing pressure sensing means responsive to pitch and yaw angular changes respectively, a pair of differential pressure responsive electrical control devices, conduit means connecting said pairs of ports to the respective control devices for actuation thereof in response to differences in pressure at opposite ports of the respective pairs, sensing head actuating means under control of the respective control devices to rotate said sensing head in directions at right angles to each other and coinciding with said vertical and horizontal planes to maintain equal pressures in the opposite ports of the respective pairs thereof, and a pair of signal producing means coupled to said sensing head actuating means to produce signals proportional to pitch and yaw angular deviations respectively of said sensing head with respect to said support.

9. A null type pitch and yaw indicating device responsive to angular deviations with respect to the air stream comprising; a universally mounted sensing head carried on a support for positioning of said head in an air flow region, said head having symmetrically arranged spaced apart pairs of ports in both the vertical and horizontal planes of said head and providing pressure sensing means responsive to pitch and yaw angular changes respectively, a pair of differential pressure responsive electrical control devices, conduit means connecting said pairs of ports to the respective control devices for actuation thereof in response to differences in pressure at opposite ports of the respective pairs, sensing head actuating means under control of the respective control devices to rotate said sensing head in directions at right angles to each other and coinciding with said vertical and horizontal planes to maintain equal pressures in the opposite ports of the respective pairs thereof, and indicating means coupled to said sensing head actuating means to simultaneously indicate the angular deviations of said sensing head with respect to said support in vertical and horizontal planes respectively.

10. A null type pitch and yaw indicating device responsive to angular deviations with respect to the air stream comprising; a tubular support for attachment at one end to a supporting element and extending forwardly in free air stream relation, a sensing head universally mounted on said tubular support at the forward end by means of a pivotally mounted gimbal element having said sensing head pivotally connected thereto, said sensing head having symmetrically arranged spaced apart pairs of ports on the forward side thereof arranged in the vertical and horizontal planes of said head and providing pressure sensing means responsive to pitch and yaw angular changes respectively, a pair of differential pressure responsive electrical control devices, conduit means connecting said pairs of ports to the respective control devices for actuation thereof in response to differences in pressure at opposite ports of the respective pairs, sensing head actuating means under control of the respective control devices to rotate said sensing head in directions at right angles to each other and coinciding with said vertical and horizontal planes to maintain equal pressures in the opposite ports of the respective pairs thereof, and indicating means coupled to said sensing head actuating means to simultaneously indicate the angular deviations of said sensing head with respect to said support in vertical and horizontal planes respectively.

DON W. YOUNG.

REFERENCES CITED

The following references are of record in the file of this patent:

UNITED STATES PATENTS

| Number | Name | Date |
|---|---|---|
| 2,463,585 | Young | Mar. 8, 1949 |